Aug. 18, 1970           C. A. ELWELL           3,524,272
SOUND REPRODUCER AND STEREOSCOPE COMBINATION
Original Filed June 25, 1964           2 Sheets-Sheet 1
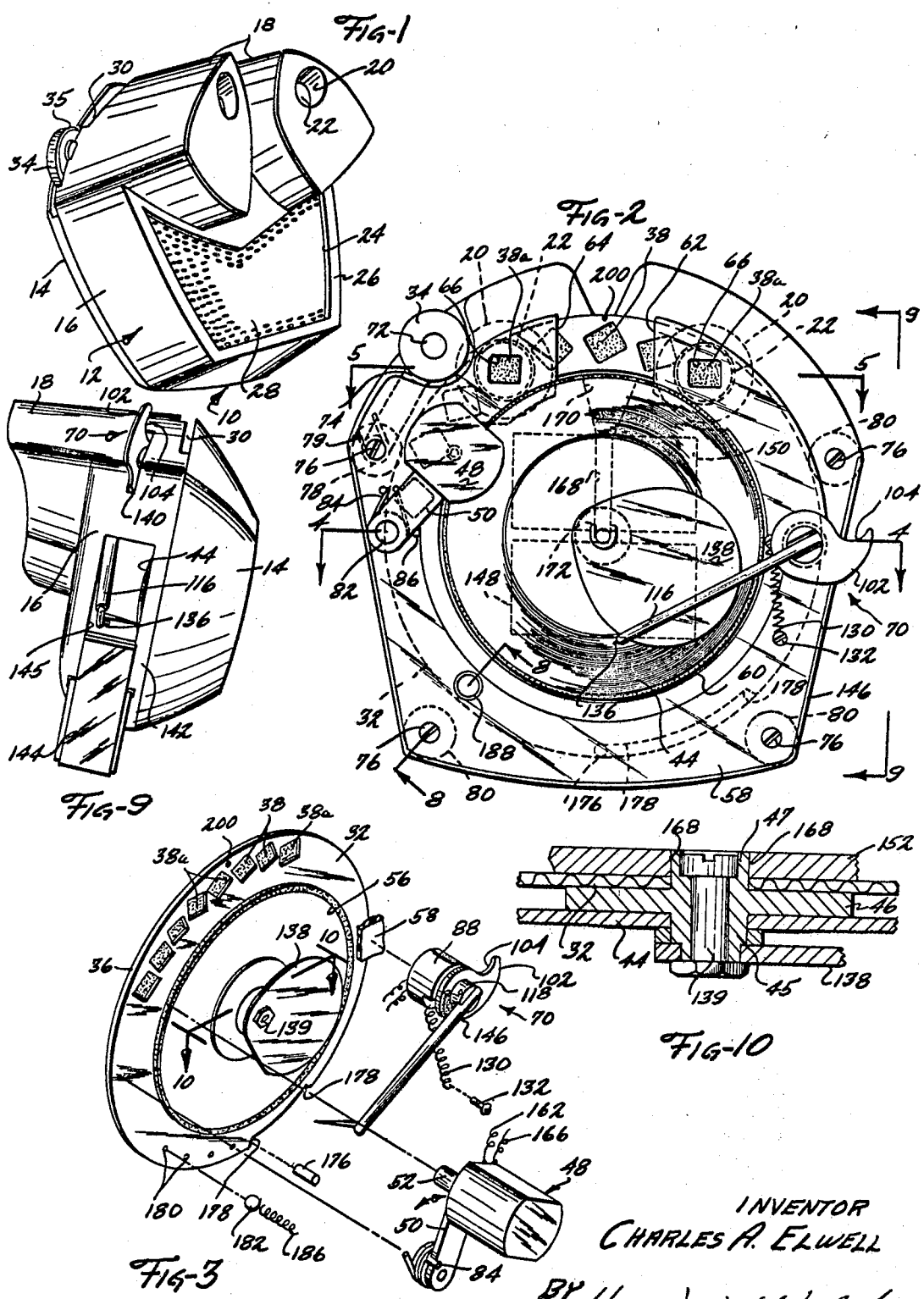
INVENTOR
CHARLES A. ELWELL
BY Herzig & Walsh
ATTORNEYS

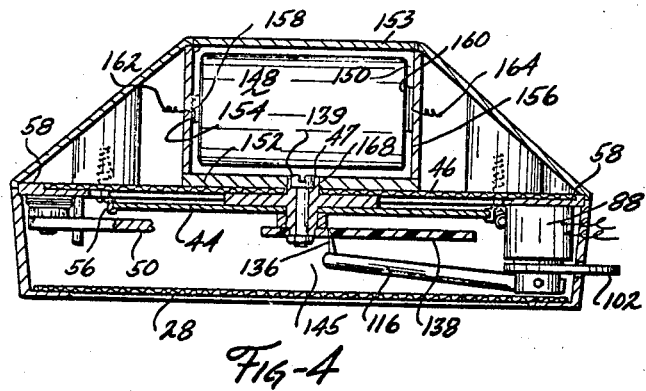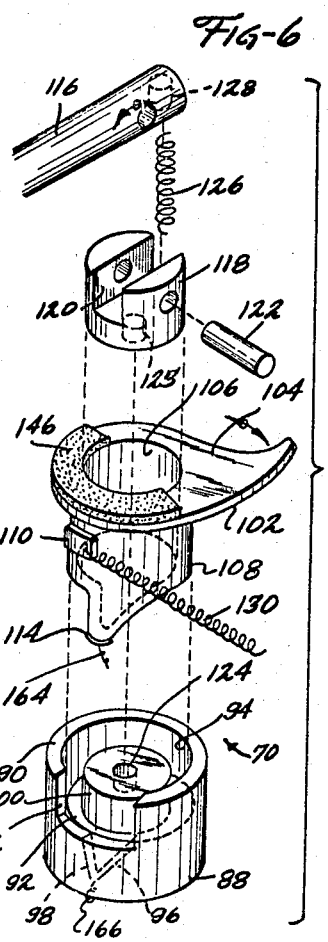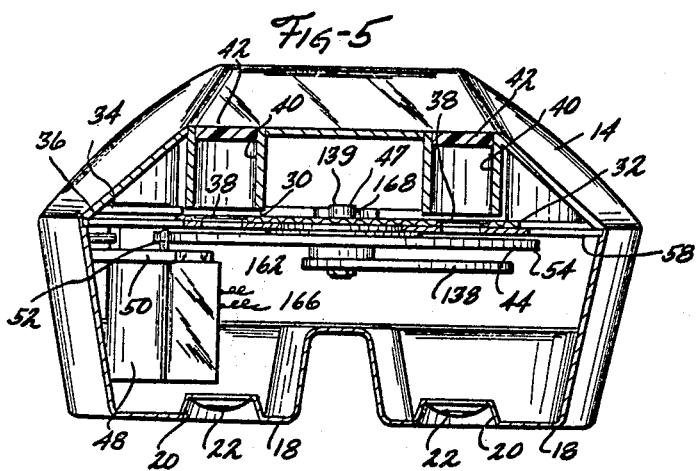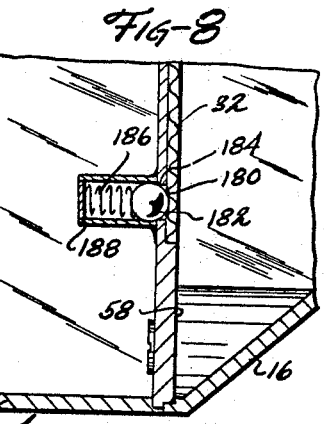

United States Patent Office 3,524,272
Patented Aug. 18, 1970

3,524,272
SOUND REPRODUCER AND STEREOSCOPE COMBINATION
Charles A. Elwell, Gardena, Calif., assignor to The Toy Development Center, Inc., Beverly Hills, Calif., a corporation of California
Original application June 25, 1964, Ser. No. 377,929, now Patent No. 3,436,083, dated Apr. 1, 1969. Divided and this application Oct. 24, 1968, Ser. No. 770,227
Int. Cl. G09f 27/00
U.S. Cl. 40—28.1
10 Claims

ABSTRACT OF THE DISCLOSURE

A stereoscopic viewer is provided with an image disc and a sound reproducer with the position of the tone arm being controlled by the image disc so as to cause the needle to reproduce that portion of the sound record which is correlated to the particular image being viewed.

---

This application is a division of earlier filed application Ser. No. 377,929, filed June 25, 1964, now Pat. No. 3,436,-083, issued Apr. 1, 1969.

This invention relates to a sound reproducer and stereoscope combination, and more particularly to a stereoscopic viewer which includes a sound reproducing mechanism which narrates a particular scene being viewed as tthe device is held up to the eyes of the viewer.

Although many sound reproducer and image projector combinations are available, they do have certain disadvantages. The major disadvantages resides in the fact that they do not lend themselves to use as a stereoscopic instrument.

Another disadvantage resides in the fact that a complicated mechanism is usually required to coordinate the sound reproduction with a particular picture being viewed.

Another disadvantage resides in the fact that the record playing mechanism is usually too bulky for use in an inexpensive device which may be held up to the viewer's eyes as a single compact unit.

Yet another disadvantage resides in the fact that as soon as the narration for a particular picture terminates, the next picture must be brought into view to maintain coordination between the narration and the picture being viewed because there is usually no provision for replaying the narration for a particular picture.

In view of the foregoing factors and conditions characteristic of sound reproducer and image projector combinations, it is a primary object of the present invention to provide a new and useful sound reproducer and stereoscope combination not subject to the disadvantages enumerated above and having means especially designed for coordinating a picture being viewed with the recorded narration of the picture efficiently and economically.

Another object of the present invention is to provide a simple stereoscopic viewer which may be held up to the eyes of the viewer and which may be manipulated while so held to automatically play a recording of a narration of a particular picture being viewed.

Yet another object of the present invention is to provide a new and useful phonograph record and stereoscopic disk combination which includes a simple cam mechanism adapted to automatically position the tone arm of the sound reproducer on the record at a correct point so that the tone arm will pick up the narration for a predetermined picture regardless of the relative rotary position of the record with respect to the picture disk.

A further object of the present invention is to provide a tone arm positioning mechanism for a sound reproducer and stereoscope combination which automatically energizes a motor to drive a phonograph record when the needle on the tone arm is brought into engagement therewith.

According to the present invention, a simple, inexpensive sound reproducer and stereoscope combination is provided which may be conveniently held up to the eyes of the user of the device and manipulated to automatically play a recording of a narration of scenes being viewed.

The device includes a small housing in which a battery operated motor and a phonograph tone arm are mounted. An image carrying disk is provided and includes a fixed center post on which a phonograph record is rotatably mounted. A needle positioning cam is affixed to the center post so that it will rotate with the picture disk while the phonograph record is free to rotate independently thereof. When the image carrying disk is slid into position in the housing and rotated to bring a particular set of images into position to be viewed, the cam will then be in a position with respect to the phonograph record so that the needle on the tone arm will engage the cam when the tone arm is swung into playing position. The cam is designed to position the needle at the correct groove on the record corresponding to the beginning of the narration for the particular pictures being viewed. The electric motor is swingably mounted within the housing and includes a driven shaft which engages the peripheral edge of the phonograph record as the picture disk is slid into the housing.

The tone arm is connected to a machanism which may be actuated to automatically swing the tone arm inwardly until the needle engages the cam whereupon the tone arm swinging mechanism lowers the needle and energizes the motor to start the record. The narration for a particular picture may be replayed as often as desired by merely releasing the tone arm swinging mechanism and depressing it again to reposition the needle against the cam. The motor is automatically de-energized when the tone arm swinging mechanism is released.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIG. 1 is a perspective view of the sound reproducer and stereoscope of the present invention;

FIG. 2 is a horizontal, cross-sectional view, on an enlarged scale, of the device of FIG. 1;

FIG. 3 is an exploded, perspective view showing the relationship of various internal parts of the device of FIG. 1;

FIG. 4 is a cross-sectional view taken along line 4—4 of FIG. 2;

FIG. 5 is a cross-sectional view taken along line 5—5 of FIG. 2;

FIG. 6 is an exploded, perspective view, on an enlarged scale, of a tone arm shifting mechanism employed in the device of FIG. 1;

FIG. 7 is a schematic view showing the relationship of the tone arm, needle positioning cam, and phonograph record used in the device of FIG. 1;

FIG. 8 is an enlarged, cross-sectional view taken along line 8—8 of FIG. 2;

FIG. 9 is an enlarged, partial, perspective view taken along line 9—9 of FIG. 2; and FIG. 10 is an enlarged cross-sectional view taken along line 10—10 of FIG. 3.

Referring again to the drawings, and particularly to FIG. 1, a sound reproducer and stereoscope combination comprising a presently preferred embodiment of the invention, generally designated 10, includes a housing 12 having a rear housing half 14 and a front housing half 16. The front housing half 16 includes a pair of eye pieces 18 each of which is provided with a cylindrical bore 20 in which is mounted a suitable lens 22. An opening 24 is provided in the front wall 26 of the front housing half 16 and a perforated screen 28 is mounted in the opening 24 to facilitate the passage of sound from the housing 12.

A slot 30 is formed between the rear housing half 14 and the front housing half 16 when they are assembled together. The slot 30 is adapted to receive an image carrying disk or picture card 32 (FIG. 3). A wheel 34 is rotatably mounted in the housing 12 in a manner to be hereinafter described and includes an annular groove 35 which is adapted to frictionally engage the peripheral edge 36 of card 32 to rotate the card when it is in position in the slot 30 in a manner to be hereinafter described. Rotation of the card 32 positions photographic images or pictures 38 in alignment with the lenses 22 which enlarge the images for viewing. The photographic images or transparencies 38 are mounted on the disk 32 in matched pairs and at spaced intervals in such a manner that a set of pictures will be positioned behind the lenses 22 for a particular setting of the card 32.

Referring now to FIG. 5, illumination for each image 38 is provided through associated light passageways 40 which are provided in the rear housing half 14. Light entering the passageways 40 is filtered by filtering lenses 42 which may comprise frosted glass, sandblasted plastic or the like.

A suitable narration for pictures being viewed through lenses 22 may be supplied by a phonograph record 44 which is rotatably mounted on a first hub portion 45 (FIG. 10) of a wheel 46 which, in turn, lends lateral support to the record 44. The picture card 32 is non-rotatably mounted on a second hub portion 47 so that the record 44 may be rotated independently of card 32. The phonograph record 44 is driven by a suitable electric motor 48 which is affixed to an arm 50. The arm 50 is pivotally mounted in the housing 12 in a manner to be hereinafter described so that the motor 48 will swing out of the way when the picture card 32 and phonograph record 44 are inserted through the slot 30. The motor 48 includes an output shaft 52 which engages the peripheral edge 54 of record 44 to rotate the record when the motor is energized. Friction between the shaft 52 and the record 44 is increased by forming the peripheral edge 54 of a material having a high coefficient of friction. This may be accomplished by encompassing the record 44 with a suitable resilient band 56 (FIGS. 3 and 4). The motor 48 has a fixed speed and the diameter of shaft 52 is such that the record 44 may be rotated at a speed consonant with good recording practice.

Referring now to the drawings generally, a partition member 58 is mounted in the housing 12 between the rear housing half 14 and the front half 16. The partition member 58 is somewhat horseshoe-shaped so that an opening 60 (FIG. 2) is provided therein. The shape of the partition 58 also results in spaced-apart upper ends 62 and 64 which form an opening through which the spindle 46 may pass when the disk 32 is inserted below the partition 58 while the record 44 passes above the partition 58. Rectangular openings 66 are provided in the partition 58 near the ends 62 and 64 so that the images or pictures 38 are visible through the partition 58. The ends 62 and 64 are preferably painted a dark color, such as black, for a suitable distance past the openings 66 thereby forming masks preventing the edges of other pictures 38 from being visible when a particular set of pictures 38a is in viewing position.

The partition 58 also serves as a frame member which carries the wheel 34, the motor 48, and a tone-arm actuating member 70. The wheel 34 is rotatably mounted by a pin 72 on one end of on arm 74. The other end of the arm 74 is pivotally supported by a screw 76 which is used to connect the rear housing half 14, the partition 58, and the front housing half 16 together. The arm 74 is also supported by a cylindrical boss 78 formed on the inside of the rear housing half 14. Other bosses 80 are provided on the rear housing half 14 to form a support for the partition 58 when the housing halves are connected together by additional screws 76 which threadedly engage the bosses 80. The arm 50 for the motor 48 is pivotally connected to the partition 58 by a suitable pin 82 which is rigidly affixed to the partition 58. A coil spring 84 is wound about the pin 82 and engages arm 50 to bias the motor 48 into engagement with the record 44. A stop member 86 is mounted on the partition 58 in the path of travel of the arm 50 to limit its travel so that the motor 48 will not swing into the opening 60 when the record 44 is withdrawn from the housing 12. The arm 74 which carries the wheel 34 is loaded with a light spring 79 (FIG. 2) which biases the wheel 34 into engagement with the edge 36 of picture card 32 when it is in position in the housing 12.

The tone-arm actuating mechanism 70 includes a hub member 88 which is rigidly affixed to the partition 58 by any suitable means such as an adhesive, not shown. The hub member 88 is generally cylindrical shape and includes an upstanding side wall 90, an inner bottom wall 92, and an open top 94, as shown in FIG. 6. A camming recess or base 96 is provided in the bottom wall 92 and a first electrical contact 98 is mounted at the bottom of the camming recess 96. A cylindrical boss 100 extends upwardly from the bottom wall 92 in spaced relation with the side wall 90 forming a pivot for a lever 102. The lever 102 includes a finger-engaging portion 104 having a circular opening 106 provided therein. A hollow, substantially cylindrical cam member 108 depends from the finger-engaging member 104 in alignment with the opening 106 and is rotatably mounted on the boss 100 in such a manner that a spring retainer 110 provided on the cam 108 will be positioned within the opening 112 provided in the side wall 90. A second electrical contact 114 is provided on the bottom of the cam 108 and is engageable with the first contact 98 when the cam 108 is seated into the camming recess 96.

A tone arm 116 operatively connected to a hub member 118 which includes a slot 120 in which the tone arm 116 is rockably mounted by a pin 122. The hub member 118 is provided with a counterbore 123 which is engageable with a pin 124 on boss 100 to pivotally connect the tone arm 116 thereto. A compression spring 126 has one end seated in a bore 128 provided at one end of the tone arm 116 and its other end seated against the hub 118 so that the tone arm 116 may be biased into engagement with the record 44.

A coil spring 130 has one end connected to the spring retainer 110 and its other end connected to the partition 58 by a screw 132 (FIGS. 2 and 3) so that the tone arm 116 is biased in a counterclockwise direction, as viewed in FIG. 2. The tone arm 116 carries a phonograph needle 136 which is engageable with a needle engaging cam 138 when the tone arm 116 is swung in a clockwise direction, as viewed in FIG. 2. The needle positioning cam 138 is rigidly affixed to the hub 45 by a bolt and nut assembly 139 (FIG. 10). As pointed out above, the picture card 32 is non-rotatably mounted on hub 47 while the phonograph record 44 is rotatably mounted on the hub 45. With this arrangement, the needle positioning cam 138 rotates with the card 32 while the phonograph record 44 rotates independently thereof. The needle positioning cam 138 is shaped in such a manner that it will automatically position the needle 136 above the record 44 at a point corresponding to the narration for the particular pictures or pohtographic transparencies 38a positioned in viewing position behind lenses 22. The needle positioning cam 138 stops further movement of the tone arm 116, but the cam 108 is free to continue rotating until it seats in the cam base 96, thereby lowering the finger engaging portion 104 away from the tone arm 116 so that spring 126 will bias the needle 136 into engagement with the record 44. As the cam 108 completes seating in the cam base 96, the second electrical contact 114 engages the first electrical contact 98 to energize motor 48 in a manner to be hereinafter described. The seating of the electrical contact 114 onto the electrical contact 98 is assured by the coaction between the finger engaging portion 104 of lever 102 and a cam face 140 which is provided in the side wall 142 of the front housing half 16, as shown in FIG. 9.

When the lever 102 is released, spring 130 rotates cam 108 in a reverse direction. This causes the finger engaging portion 104 to slide off cam face 140 while cam 108 unseats from cam base 96 so that the electrical contact 114 becomes disengaged from contact 98 to de-energize motor 48. As the cam 108 rides up out of cam base 96, a resilient pad 146 (FIG. 6) engages the tone arm 116 to lift it and carry it with the lever 102 as it continues its return stroke under the influence of spring 130. The return stroke of lever 102 terminates when the tone arm 116 reaches the side wall 142. A sliding door 144 is provided in the side wall 142 and serves to provide access to the needle 136. The needle 136 may be readily changed by loosening a thumb screw 116a which then readily engages the end of tone arm 116 and bears against needle 136.

The motor 48 may be a 1½-volt motor powered by a pair of suitable batteries 148 which are mounted in a battery chamber 150 provired in the rear housing half 14. If desired, 1½-volt dry cell batteries may be provided and wired in a parallel circuit for longer battery life. The chamber 150 (FIG. 4) includes a front wall 152, a sliding door 153, a first side wall 154, and a second side wall 156. Electrical contacts 158 and 160 are mounted on the side walls 154 and 156, respectively. A first electrical lead 162 connects the contact 158 to the motor 48 and a second electrical lead 164 connects the contact 160 to the contact 114 on cam 108. The contact 98 on the member 88 is connected by a lead 166 to the motor 48 to complete a circuit through the batteries.

The front wall 152 of the chamber 150 is provided with a vertical slot 168 having an open end 170 and a closed end 172. The open end 170 is flared outwardly, as shown in FIG. 2, to facilitate guiding the hub 47 into position as the card 32 is inserted into slot 30. The hub 47 seats at the closed end 172 which serves as a bearing for the hub 47 to provide smooth rotation of the picture card 32 when selecting pictures by rotating wheel 34. The amount of rotation of the card 32 is controlled by a stop pin 176 (FIG. 2) which is mounted on the partition member 58 in the path of travel of the picture disk 32. A lower quadrant of the picture disk 32 is cut away to provide stops 178 which engage the stop pin 176.

Proper positioning of a particular set of pictures, such as the pictures 38a, behind the lenses 22 is assured by providing detents 180 on the edge of the picture card 32 which are engageable by a small, slightly spring loaded ball 182 (FIGS. 3 and 8) which drops into a detent 180 to align the pictures 38a. The ball 182 is mounted in an aperture 184 provided in the partition 58 and is maintained in position therein by a compression spring 186 which is mounted in a cylindrical housing 188.

Referring now to FIG. 7, the record 44 is recorded from the inside to the outside peripheral edge and revolves clockwise. The type of recording on the record 44 is the vertical (hill and dale) type. The recording of the narration for the first set of pictures 38a may be started on the record 44 at a groove designated by the numeral 190. At the conclusion of the narration, a "beep-beep" tone is recorded into the record signalling the end of the narration for a particular picture, at which time the lever 102 is manually released to stop the motor 48. The narration for a second set of pictures 38b (FIG. 3) starts at a record groove 192 and concludes at a record groove 194. The narration for a third set of pictures 38c commences at the groove 194 and terminates at a groove 196 where the narration for a fourth set of pictures 38d commences. The narration for the fourth set of pictures terminates at a tie-off groove 198 so that the needle 136 will not engage the peripheral band 56 if the mechanism 104 is not manually released to deenergize motor 48 at the end of the fourth narration. The configuration of the cam 138 is such that, when the first set of pictures 38a is positioned behind the lenses 22, the cam 138 will be in the position shown in solid lines in FIG. 7. Then, when the lever 102 is depressed to swing the tone arm 116 clockwise, as viewed in FIG. 7, the tone arm 116 will swing inwardly toward the cam until the needle 136 engages the cam, stopping further swinging of the tone arm 116. Further actuation of the lever 102 then lowers cam 108 and spring 126 biases tone arm 116 so that the needle 136 engages groove 190 to start the narration for the pictures 38a. At the conclusion of this narration the needle 136 will have travelled to the groove 192, whereupon the lever 102 may be manually released to stop motor 48. When the lever 102 is so released, the spring 130 swings the tone arm 116 in a counterclockwise direction until it engages the side wall 142. Should it be desired to replay the narration for the pictures 38a, the lever 102 may again be depressed swinging tone arm 116 in a clockwise direction until the needle 136 engages cam 138 whereupon the needle will again be positioned at groove 190. Since the cam 138 is affixed to the hub 45 so that it rotates with the picture card 32, so long as particular set of pictures is in position behind the lenses 22, the cam 138 will always position the needle 136 at the same predetermined point on the record 44.

If desired, a suitable indicia 200 may be provided on the upper edge of the record 32 to indicate the point at which the card 32 may be grasped for proper insertion into the housing 12 through the slot 30.

Although it has been found that the device 10 operates satisfactorily without a speaker, a speaker, not shown, may be provided should it be desired to improve the tone emitted by the record 44. The perforated grill 28 facilitates the passage of sound from the tone arm 116 to the exterior of the device 10.

In use, a picture card assembly 32 may be grasped at the indicia 200 and inserted into the slot 30 in the housing 12. As the card assembly 32 is pushed gently downwardly, the peripheral edge 36 of the card assembly engages the groove 35 in wheel 34 and the record 44 engages the shaft 52 of motor 48 to swing the motor 48 to its proper position while the card assembly 32 is being guided into the housing 12 by the hub 47 sliding in slot 168. The card 32 is pushed gently downwardly until the hub 47 bottoms into the cradle formed at end 172 of slot 168. Wheel 34 may then be rotated to bring a desired set of pictures 38a into view behind the lenses 22. The pictures may be viewed by holding the device 10 up to the eyes of the user of the device while facing the device toward a light source. Light entering the diffusers 42 will illuminate the pictures which are magnified by the lenses 22. When it is desired to hear the sound for the pictures, the lever 102 may be depressed. Since the cam 108 is not seated in the cam base 96, the lever 102 carries the tone arm 116 on pad 146 toward the center of the record 44 until the needle 136 engages needle cam 138. At this point, the tone arm 116 will remain stationary while the cam 108 continues to rotate causing the surface of pad 146 (FIG. 6) to slide on the underside of tone arm 116 until the pad 146 is lowered away from tone arm 116 by the seating of the cam 108. This leaves the tone arm free to rotate horizontally on member 118. The cam face 140 in side wall 142 causes the cam 108 to seat in cam base 96 permitting the tone arm 116 to be lowered until the needle 136 engages the record 44 at a point corresponding to the beginning of the narration for the particular pictures in position behind the lenses 22. The cam 108 completes seating into the cam base 96 causing the first electrical contact 114 to engage the second electrical contact 98 completing a circuit through batteries 148 to motor 48. This energizes the motor causing it to rotate the record 44 so that the information recorded thereon may be heard through the perforated grill 28. At the conclusion of the narration for the pictures in position behind the lenses 22, a beep-beep tone will be heard, at which time the lever 102 may be released. The spring 130 causes the cam 108 to be rotated in a counterclockwise direction, as viewed in FIG. 2, causing the second electrical contact 114 to be lifted from the first electrical contact 98 so that the motor 48 will stop rotating record 44. As the cam 108 raises up out of the cam base 96, the pad 146 engages the underside of the tone arm 116 raising the needle 136 off of record 44 and carrying the tone arm 116 with it until the tone arm engages the wall 142. Should it be desired to replay the same narration while the pictures are still in position behind the lenses 22, the lever 102 may again be depressed to swing the tone arm 116 in a clockwise direction until the needle 136 again engages the cam 138 to again position the needle 136 above the beginning of the narration.

The pictures on the card 32 may be viewed in any sequence and the narration for any set of pictures may be replayed as often as desired because the cam 138 will automatically position the needle 136 above the proper groove in record 44 each time lever 102 is depressed. As the card 32 is rotated by wheel 34 to bring a different set of pictures into view behind the lenses 22, the ball 182 will ride on the edge of card 32 until it engages a detent 180 associated with the particular pictures being positioned behind the lenses 22 imparting a tactile resistance to further rotation of the card 32.

While the particular sound reproducer and stereoscope combination herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A picture disk and sound record combination comprising: a picture disk rotatable about an axis having photographic images mounted thereon at predetermined locations; a sound record rotatable about said axis and rotatably associated with said picture disk, said sound record having information recorded thereon for narrating said photographic images; and means to position a pickup on said sound record at the beginning of the narration for a predetermined photographic image.

2. A combination as in claim 1 comprising: means whereby the positioning of said pickup is controllable by said picture disk.

3. A combination as in claim 1 wherein said sound record is movable independently of said picture disk.

4. A combination as in claim 3 comprising a housing having said picture disk and sound record assembly rotatably mounted therein; motor means mounted in said housing for driving said sound record; and means mounted in said housing for moving said pickup over said sound record to predetermined positions determined by the amount of rotation of said assembly within said housing.

5. The combination of claim 4 wherein including cam means for positioning said pickup.

6. A sound reproducer and stereoscopic viewing combination comprising: a picture disk having photographic transparencies mounted thereon at predetermined locations; spindle means affixed to said picture disk, a phonograph record rotatably mounted on said spindle means, said phonograph record having information recorded thereon for narrating said transparencies; cam means nonrotatably mounted on said spindle means for rotation with said picture disk independently of said phonograph record, said cam means comprising a needle stop to position a phonograph needle on said phonograph record at the beginning of the narration for a predetermined transparency; viewing means for viewing said transparencies; motor means for rotating said phonograph record; tone arm means mounted for reproducing the information recorded on said phonograph record, said tone arm means including a phonograph needle; and tone arm positioning means connected to said tone arm means for simultaneously swinging said needle into engagement with said cam means and for energizing said motor means to rotate said phonograph record.

7. The combination of claim 6 including means for rotating said picture disk to expose said transparencies in a predetermined sequence.

8. A phonograph device having a record and a tone arm carrying a needle, said record having sound recorded thereon in tracks at varying distances from the center, adjustable stop means for positioning the tone arm for reproducing sound on different of said tracks, drive means for the record, and means for bringing about positioning of the tone arm in a predetermined position and energizing the drive means for reproducing sound, said means comprising a picture disc rotatable about said center.

9. A device as in claim 9 wherein said positioning means includes a member manipulatable to lift the tone arm and rotate it and operate contact controlling the drive means.

10. A device as in claim 8 including means whereby the adjustable stop means is positioned by the picture disk.

References Cited

UNITED STATES PATENTS

| 2,618,197 | 11/1952 | Boushey | 40—28.1 X |
| 2,985,069 | 5/1961 | Sampson | 40—28.1 X |
| 3,122,053 | 2/1964 | Dimitricopoulous et al. | 40—28.1 X |

EUGENE R. CAPOZIO, Primary Examiner

W. J. CONTRERAS, Assistant Examiner

U.S. Cl. X.R.

40—70

UNITED STATES PATENT OFFICE
CERTIFICATE OF CORRECTION

Patent No. 3,524,272    C.A. ELWELL    August 18, 1970

Column 8, line 41, numeral "9" should be --8--.

Signed and sealed this 22nd day of August 1972.

(SEAL)
Attest:

EDWARD M. FLETCHER, JR.
Attesting Officer

ROBERT GOTTSCHALK
Commissioner of Patents